United States Patent
Ballance et al.

(10) Patent No.: US 12,411,085 B2
(45) Date of Patent: Sep. 9, 2025

(54) MINIATURE ATOMIC SPECTROSCOPY REFERENCE CELL SYSTEM

(71) Applicants: ColdQuanta, Inc., Boulder, CO (US); COLDQUANTA UK LIMITED, Oxford (GB)

(72) Inventors: Timothy George Ballance, Oxford (GB); Evan Salim, Lafayette, CO (US); David Bowman, Oxford (GB)

(73) Assignees: ColdQuanta, Inc., Boulder, CO (US); COLDQUANTA UK LIMITED

( * ) Notice: Subject to any disclaimer, the term of this patent is extended or adjusted under 35 U.S.C. 154(b) by 367 days.

(21) Appl. No.: 18/106,455

(22) Filed: Feb. 6, 2023

(65) Prior Publication Data
US 2023/0258562 A1    Aug. 17, 2023

Related U.S. Application Data

(60) Provisional application No. 63/308,849, filed on Feb. 10, 2022.

(51) Int. Cl.
G01N 21/64    (2006.01)
(52) U.S. Cl.
CPC ... *G01N 21/6404* (2013.01); *G01N 2201/068* (2013.01)
(58) Field of Classification Search
CPC .................................................. G01J 3/4406
See application file for complete search history.

(56) References Cited

U.S. PATENT DOCUMENTS

| | | | | |
|---|---|---|---|---|
| 3,858,980 A * | 1/1975 | West | ............ | G01N 21/74 |
| | | | | 356/312 |
| 3,897,155 A * | 7/1975 | Smythe | ............ | G01N 21/6404 |
| | | | | 356/325 |
| 4,350,661 A * | 9/1982 | Davis | ............ | G01N 21/6402 |
| | | | | 73/147 |
| 4,432,644 A * | 2/1984 | Demers | ............ | G01N 21/6404 |
| | | | | 356/316 |
| 6,300,638 B1 * | 10/2001 | Groger | ............ | G01N 21/7703 |
| | | | | 250/458.1 |
| 6,489,609 B1 * | 12/2002 | Baba | ............ | G01N 21/6404 |
| | | | | 250/281 |

(Continued)

FOREIGN PATENT DOCUMENTS

CN    209690172 U    11/2019

OTHER PUBLICATIONS

John Kitching, Chip-Scale Atomic Devices, Applied Physics Review 5, 031302 (2018), published Aug. 14, 2018.

(Continued)

*Primary Examiner* — David J Makiya
*Assistant Examiner* — Soorena Kefayati
(74) *Attorney, Agent, or Firm* — Young Basile Hanlon & MacFarlane, P.C.

(57) ABSTRACT

A spectroscopy system is described. The spectroscopy system includes a cell, a photodiode, and mirrors. The cell has walls forming a chamber therein. The chamber is configured to receive laser signal(s) and retaining a vapor therein. The vapor fluoresces in response to the laser signal(s). The mirrors are configured to direct fluorescent light from the vapor toward the photodiode. In some embodiments, the spectroscopy system is incorporated with a photonic integrated circuit.

17 Claims, 6 Drawing Sheets

(56) References Cited

U.S. PATENT DOCUMENTS

| | | | |
|---|---|---|---|
| 10,753,863 B1* | 8/2020 | Hug | G01J 3/2803 |
| 2005/0134836 A1* | 6/2005 | Paldus | G01J 3/10 |
| | | | 356/73 |
| 2008/0278710 A1* | 11/2008 | Schmidt | G04F 5/145 |
| | | | 356/73 |
| 2009/0242804 A1* | 10/2009 | Obara | G01N 21/274 |
| | | | 250/461.1 |
| 2011/0036995 A1* | 2/2011 | Binnie | G01N 15/1404 |
| | | | 250/461.1 |
| 2012/0014837 A1* | 1/2012 | Fehr | G01N 21/75 |
| | | | 385/12 |
| 2014/0204382 A1* | 7/2014 | Christensen | G01N 21/3504 |
| | | | 356/402 |
| 2014/0368826 A1* | 12/2014 | Abbott, Jr. | G01N 21/255 |
| | | | 356/454 |
| 2015/0316412 A1* | 11/2015 | Bond | G01J 3/0218 |
| | | | 356/437 |
| 2016/0028210 A1* | 1/2016 | O'Shaughnessy | H01S 3/2383 |
| | | | 372/34 |
| 2016/0084761 A1* | 3/2016 | Rothberg | C12Q 1/6869 |
| | | | 506/4 |
| 2016/0214107 A1* | 7/2016 | Viasnoff | G02B 21/361 |
| 2016/0231244 A1* | 8/2016 | Camargo | G01N 21/031 |
| 2016/0305882 A1* | 10/2016 | Goeders | B82Y 20/00 |
| 2017/0191932 A1* | 7/2017 | Kokkin | G01J 3/433 |
| 2017/0248514 A1* | 8/2017 | Pavey | G01N 33/0063 |
| 2019/0049300 A1* | 2/2019 | Gu | G01J 3/44 |
| 2019/0302024 A1* | 10/2019 | Sun | G01N 21/0303 |
| 2021/0218224 A1* | 7/2021 | Dyer | H01S 5/0427 |
| 2021/0389321 A1* | 12/2021 | Kaushik | G01N 21/64 |
| 2022/0136962 A1* | 5/2022 | Kosterev | G01N 21/31 |
| | | | 356/319 |

OTHER PUBLICATIONS

Zoe Z. Yan, Nonlinear Spectroscopy of Rubidium and Frequency Stabilization of a 1560 nm Diode Laser, An Undergraduate Dissertation, Department of Physics Stanford University, May 2014.

* cited by examiner

MINIATURE ATOMIC SPECTROSCOPY REFERENCE CELL SYSTEM

CROSS REFERENCE TO OTHER APPLICATIONS

This application claims priority to U.S. Provisional Patent Application No. 63/308,849 entitled MINIATURE ATOMIC SPECTROSCOPY REFERENCE CELL SYSTEM filed Feb. 10, 2022 which is incorporated herein by reference for all purposes.

BACKGROUND OF THE INVENTION

Saturated absorption spectroscopy may be utilized to produce a doppler-free atomic reference for stabilizing laser systems. Typically, a saturated atomic absorption spectroscopy cell utilizes pump and probe laser beams transmitted in opposite directions through a vapor in the cell. When the lasers are appropriately tuned, the vapor absorbs light from the pump and probe lasers. The intensity of the beam diminishes. The probe beam is tapped and the portion of the probe beam provided to a photodiode for measurement. Thus, the reduction in intensity of the tapped probe beam provides a measure of the absorption of the probe beam. The frequency of the tapped probe beam can be used in stabilizing and/or calibrating other laser systems.

However, there may be significant drawbacks to such spectroscopy. Measurement of absorption utilizes a relatively small change (i.e. the absorption) in a relatively large signal (i.e. intensity of the laser). Thus, the signal-to-noise ratio may be small. Photon shot noise in the absorption beam may further reduce the signal-to-noise ratio. Moreover, the relative absorption signal is dependent upon the path length in the cell. As a result, the saturated atomic absorption spectroscopy cell is desired to be longer, often on the order of five to ten centimeters or more. Such a cell does not lend itself to miniaturization or use with technologies such photonic integrated circuits. To implement a saturated atomic absorption spectroscopy cell, the pump and probe lasers are frequently taken from a single laser. Thus, the optical components such as splitters are used in conjunction with the atomic absorption spectroscopy cell. This also complicates integration of the cell with other technologies. Accordingly, what is needed is an improved technique for atomic spectroscopy.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A spectroscopy system is described. The spectroscopy system includes a cell, a photodiode, and mirrors. The cell has walls forming a chamber therein. The chamber is configured to receive laser signal(s) and retaining a vapor therein. The vapor fluoresces in response to the laser signal(s). The mirrors are configured to direct fluorescent light from the vapor toward the photodiode. In some embodiments, the mirrors are internal to the chamber, while in other embodiments, some or all of the mirrors may be external to the chamber. The spectroscopy system may also include first and second mirrors, which may be mounted on opposite ends of the chamber. The first and second mirrors are configured to reflect the laser signal(s) such that laser beams propagate in opposing directions in the chamber. In some embodiments, the spectroscopy system is incorporated with a photonic integrated circuit (PIC).

A photonic integrated circuit (PIC) is described. The PIC includes output gratings on a substrate and a PIC spectroscopy system coupled to a surface of the PIC. The output gratins are configured to couple laser signal(s) out-of-plane with respect to the substrate. Thus, out-of-plane laser signal(s) are provided. The spectroscopy system includes a cell, a photodiode, and mirrors. The cell has walls forming a chamber therein. The chamber is aligned with the output gratings and retains a vapor. The vapor fluoresces in response to the out-of-plane laser signal(s). The mirrors are configured to direct fluorescent light from the vapor to the photodiode.

A method for providing a spectroscopy system is described. The method includes providing a cell having walls and a chamber therein. The chamber is configured to receive laser signal(s) and to retain a vapor therein. The vapor fluoresces in response to the laser signal(s). The method also includes coupling mirrors to the walls and providing a photodiode. The mirrors are oriented to direct fluorescent light from the vapor toward the photodiode. The method may also include providing first and second mirrors. The second mirror is opposite to the first mirror. The first and second mirrors reflecting the laser signal(s) such that laser beams propagate in opposing directions in the chamber.

Figure 1:
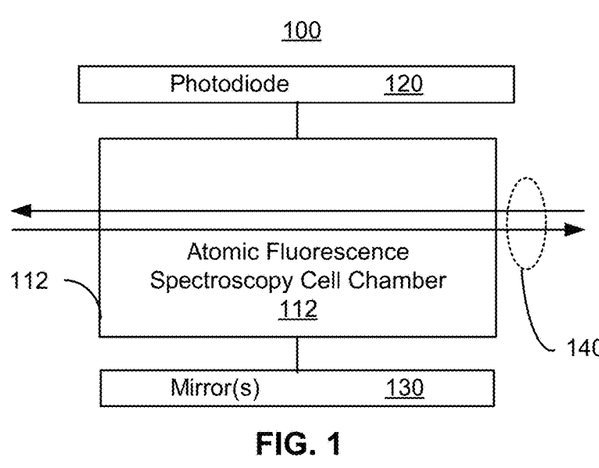
FIG. 1 is a diagram depicting an embodiment of a system for performing atomic fluorescence spectroscopy.

FIG. 1 is a block diagram depicting an embodiment of system 100 for performing atomic fluorescence spectroscopy. Because FIG. 1 is a block diagram, the location of components of system 100 in FIG. 1 are not intended represent positions in space. System 100 includes atomic spectroscopy cell 110 having a chamber 112 therein, one or more mirrors 130, and one or more photodiodes 120. Chamber 112 retains a vapor, such as Rb, which undergoes fluorescence if light of the appropriate frequency is incident on the vapor. More specifically, the vapor absorbs light of the frequency corresponding to a transition between electronic levels. The vapor fluoresces and, therefore, emits light. Photodiode 120 senses light. Also shown are laser signal(s) 140 that traverse chamber 112. Laser signal(s) 140 thus provide the light that causes vapor in chamber 112 to fluoresce. In some embodiments, laser signal(s) 140 entering chamber 112 may be formed from a free space beam. In some embodiments, laser signal(s) 140 may be from a waveguide grating coupler (not shown) that is bonded onto the input window of cell 110.

Mirror(s) 130 may be considered to be any mechanism that can redirect the fluoresced light. For example, mirror(s) 130 may simple be simple reflectors or may have a more complicated structure. Mirror(s) 130 may be mounted internal to chamber 112 or may be external to chamber 112. In such embodiments, the walls of cell 110 are transparent to the fluoresced light.

In operation, laser signal(s) 140 pass through chamber 112. Thus, some or all of at least one of the walls of cell 110 may be transparent. In some embodiments, a single laser signal enters chamber 112 from a one wall, e.g. through a window, a use of a transparent wall, or other mechanism. The laser signal 140 passes through chamber 112 and is reflected from a mirror (not shown) on the opposing wall. Mirrors (not shown) on one or both opposing walls of chamber 112 allow laser signal(s) 140 to traverse chamber 112 multiple times. In other embodiments, multiple laser sources are used. Thus, laser signal(s) 140 may propagate in opposite directions. This may allow for Doppler-free measurements. This also provides additional opportunity for laser signal(s) 140 to excite vapor and, therefore, for vapor to emit fluoresced light.

If laser signal(s) 140 are tuned to transition(s) of the vapor in chamber 112, the vapor absorbs light, reaches an excited state, and emits photons. The vapor in chamber 112 thus undergoes atomic fluorescence. Photodiode 120 senses light. Further, photodiode 120 is mounted such that laser signal(s) 140 are not incident on photodiode. Thus, the light sensed by photodiode 120 may be mostly or completely limited to the fluoresced light. Stated differently, the photocurrent of photodiode 120 arising directly from laser signal(s) 140 may be minimized. Shot noise may also be reduced or minimized.

However, fluoresced light from the vapor travels in a variety of directions. Without more, the signal detected by photodiode 120 may be lower than desired. Mirror(s) 130 redirect the fluoresced light toward photodiode 120. Mirror(s) 130 may thus improve the collection efficiency of photodiode 120. In some embodiments at least fifty percent of the fluoresced light is incident on photodiode(s) 120 because of the use of mirror(s) 130. In some embodiments, at least seventy percent of the fluoresced light is incident on photodiode(s) 120. In some such embodiments, at least ninety percent (e.g. close to one hundred percent) of the fluoresced light is incident on photodiode(s) 120. Consequently, a higher fluorescence signal may be detected. In some embodiments, the line width of the fluorescence signal detected may be as low as 2 MHz or 1 MHz. In some embodiments, the line width of the fluorescence signal may be lower. For example, 0.5 MHz or 0.1 MHz might be possible in some embodiments. The detected fluorescence may be used to calibrate an apparatus or as a reference signal for other apparatus. For example, spectroscopy system 100 may be used as a reference to stabilize 780 nm laser for laser cooling, or 1560 nm C-band lasers for coherent signal transmission (such as QAM).

In addition to having a higher signal-to-noise ratio, system 100 may be more readily miniaturized. For example, the length of chamber 112, and thus cell 110, in the direction of propagation of laser signal(s) 140 may be not more than ten millimeters. In some embodiments, this length is not more than five millimeters. In some embodiments, the length is not longer than one millimeter. The reduction in length may be due to mirrors (not shown) at opposing ends of chamber 110, which allows laser signal(s) 140 to traverse chamber 112 multiple times. Because it may be miniaturized, spectroscopy system 100 may be more readily used with other technologies. For example, system 100 may be more readily integrated with a photonic integrated circuit (PIC). In addition, a smaller-sized spectroscopy cell may be warmed up and stabilized more rapidly than a larger system. For example, in some embodiments, system 100 may be stabilized and ready for use in less than one minute (e.g. five to ten seconds), instead of hours. Thus, system 100 is more rapidly usable. Thus, system 100 may be more readily used for reference and/or calibration of lasers, as well as for other applications.

Figure 2A:
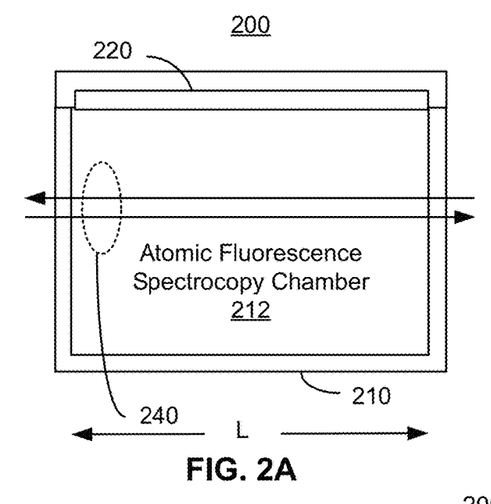
FIGS. 2A-2C depict side, end, and top views of an embodiment of a system for performing atomic fluorescence spectroscopy.
Figure 2B:
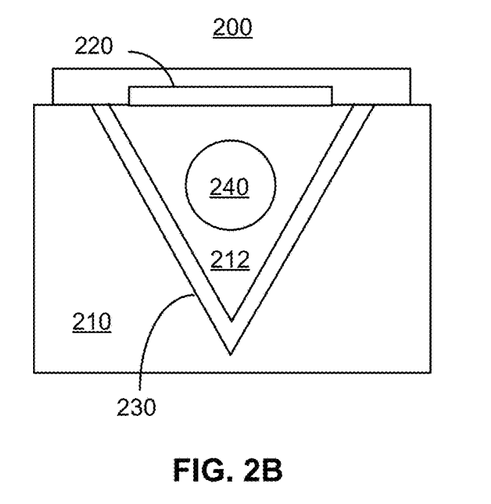
Figure 2C:
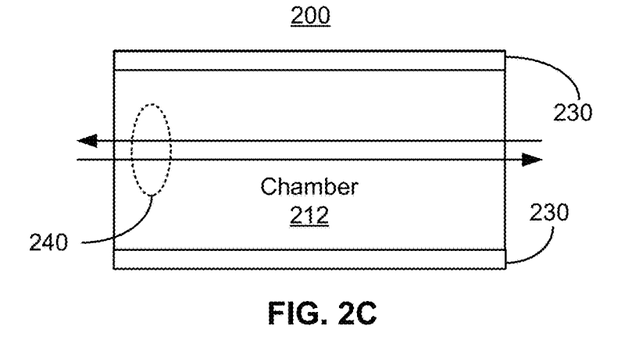

FIGS. 2A-2C depict side, end, and top views of an embodiment of system 200 for performing atomic fluorescence spectroscopy. For simplicity, system 200 is not to scale. System 200 is analogous to system 100. Consequently, analogous components have similar labels. System 200 includes spectroscopy cell 210, photodiode 220, and mirror(s) 230 that are analogous to cell 110, photodiode(s) 120, and mirror(s) 130. Also shown are laser signal(s) 240 that are analogous to laser signal(s) 140.

Spectroscopy cell 210 may be a vacuum substrate (e.g. a silicon substrate) and has chamber 212 therein. In some embodiments, chamber 212 is formed by removing a portion of the vacuum substrate. For example, a v-groove may be formed in the substrate to form chamber 212 having a triangular cross-section. Chamber 212 is sealed by the substrate on which photodiode 220 is mounted. Further, photodiode 220 is mounted such that laser signal(s) 240 are not incident on photodiode. Thus, the light sensed by photodiode 220 may be mostly or completely limited to the fluoresced light. Chamber 212 retains a vapor, such as Rb, which undergoes fluorescence if light of the appropriate frequency (i.e. laser signal(s) 240 tuned to the appropriate frequency) is incident on the vapor.

Mirror(s) 230 are aligned to redirect the fluoresced light toward photodiode 220. In some embodiments, mirror(s) 220 may be mounted on the internal walls of chamber 212. In some embodiments, mirror(s) 220 may be a reflective material that is deposited on the inner walls of chamber 212. Thus, two walls hold mirror(s) 230, while the third wall holds (or is formed by) photodiode 220 and the substrate to which photodiode 220 is attached or formed on. Because of the cross-section of chamber 212, mirror(s) 230 redirect toward photodiode 220 light fluoresced by the vapor that would otherwise travel away from photodiode 220.

In operation, laser signal(s) 240 pass through chamber 212. In the embodiment shown, counter propagating laser beams are used for laser signal(s) 240. In some embodiments, the frequency of laser signal(s) 240 is swept through a range including the appropriate signal for fluorescence of the vapor. Laser signal(s) 240 having the appropriate frequency excite vapor. In response, the vapor emits fluoresced light. Some of the fluoresced light is incident directly on photodiode 220. Some or all of the fluoresced light is emitted in directions away from photodiode 220. Mirror(s) 230 redirect most or all of this fluoresced light toward photodiode 220. Photodiode 220 senses this light an outputs a photocurrent. Consequently, a higher fluorescence signal may be detected. In some embodiments, the line width of the fluorescence signal detected may be in the ranges described and higher the signal-to-noise ratio described herein may be achieved. Moreover, system 200 may be more readily miniaturized. For example, the length, L, in the direction of propagation of the laser signal(s) 240 may be in the ranges (e.g. not more than one, five, or ten millimeters) described herein. Therefore, system 200 may not only have improved performance, but may also be more readily integrated with technologies, such as a PIC. In addition, system 200 may be more rapidly stabilized and readily used.

Figure 3A:
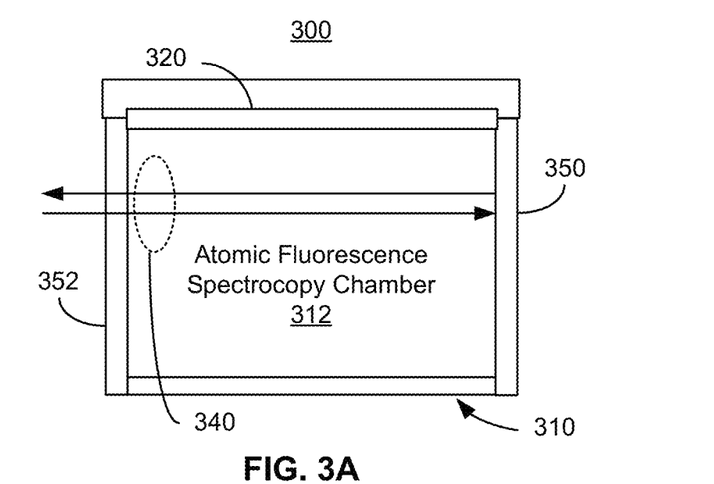
FIGS. 3A-3C depict side, end, and top views of an embodiment of a system for performing atomic fluorescence spectroscopy.
Figure 3B:
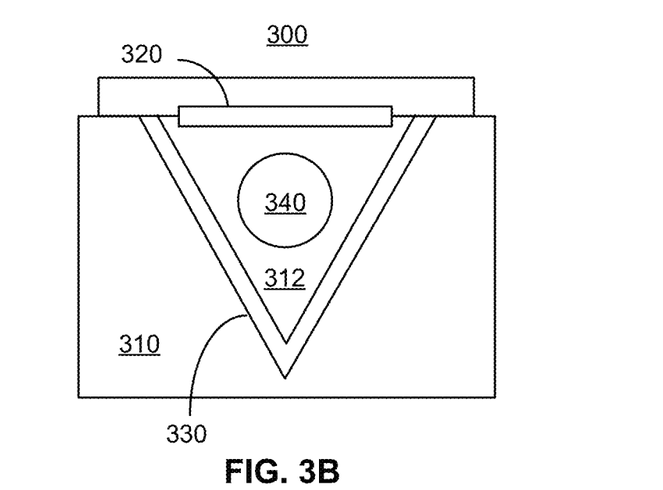
Figure 3C:
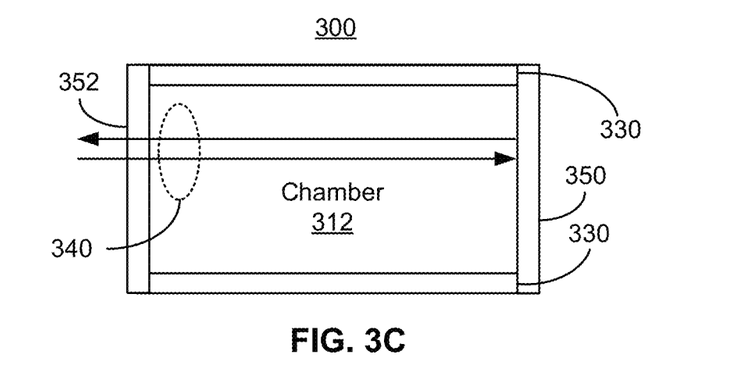

FIGS. 3A-3C depict side, end, and top views of an embodiment of system 300 for performing atomic fluorescence spectroscopy. For simplicity, system 300 is not to scale. System 300 is analogous to systems 100 and/or 200. Consequently, analogous components have similar labels. System 300 includes spectroscopy cell 310, photodiode 320, and mirror(s) 330 that are analogous to cells 110 and 210, photodiode(s) 120 and 220, and mirror(s) 130 and 230. Also shown are laser signal(s) 340 that are analogous to laser signal(s) 140 and 240.

In addition, system 300 includes mirrors 350 and 352 on opposing sides of chamber 312. Mirrors 350 and 352 are configured to reflect laser signal(s) 340. In the embodiment shown, mirror 352 may include a window or other feature that allow some of the laser signal(s) 340 to enter chamber 312. Thus, a single laser signal may be used for system 300. In some embodiments, mirror 350 and/or 352 might be omitted.

System 300 operates in an analogous manner to systems 100 and 200. In particular, laser signal(s) 340 pass through chamber 312 and are reflected by mirrors 350 and 352. When tuned to the appropriate frequency, laser signal(s) excite the vapor in chamber 312. In response, the vapor emits fluoresced light. Some of the fluoresced light is incident directly on photodiode 320. Some or all of the fluoresced light emitted in directions away from photodiode 320 may be redirected by mirror(s) 330 toward photodiode 320. Consequently, a higher fluorescence signal may be detected by photodiode 320. In some embodiments, the line width of the fluorescence signal detected may be in the range described and the higher signal-to-noise ratio described herein may be achieved. Moreover, system 300 may be more readily miniaturized. For example, the length of chamber 330 in the direction of propagation of the laser signal(s) 240 may be in the ranges described herein. Therefore, system 300 may not only have improved performance, but may also be more readily integrated with technologies, such as a PIC. In addition, system 300 may be more rapidly stabilized and readily used.

Figure 4:
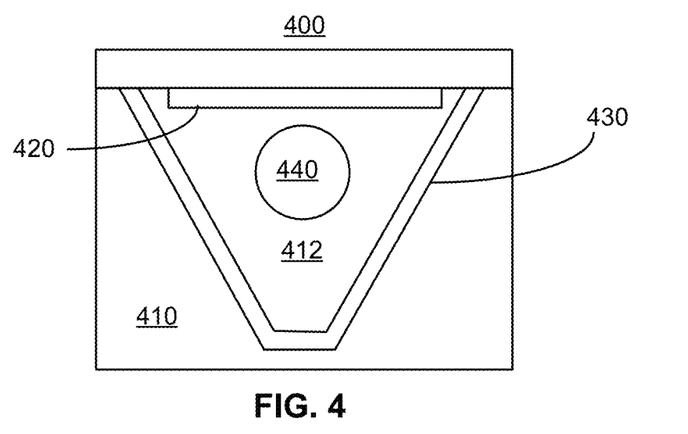
FIG. 4 depicts an end view of an embodiment of a system for performing atomic fluorescence spectroscopy.
Figure 5:
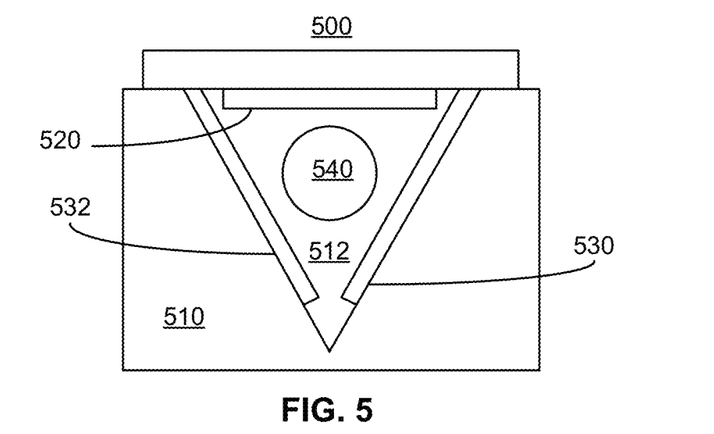
FIG. 5 depicts an end view of an embodiment of a system for performing atomic fluorescence spectroscopy.
Figure 6:
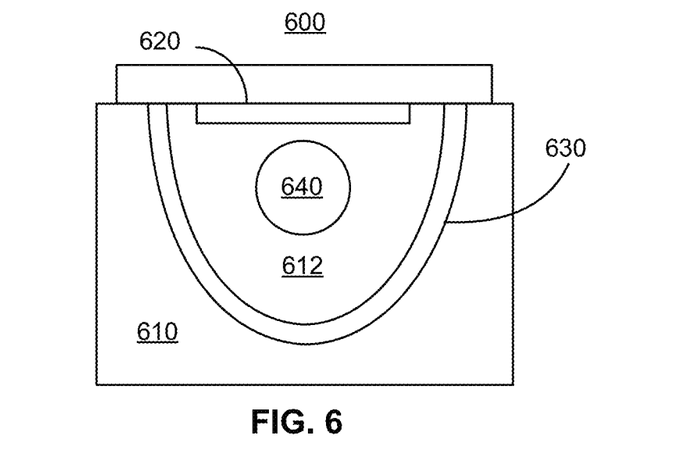
FIG. 6 depicts an end view of an embodiment of a system for performing atomic fluorescence spectroscopy.

FIGS. 4-6 depict end views of embodiments of systems 400, 500, and 600, respectively, for performing atomic fluorescence spectroscopy. For simplicity, FIGS. 4-6 are not to scale. Systems 400, 500, and 600 are analogous to systems 100, 200, and/or 300. Consequently, analogous components have similar labels. Systems 400, 500, and 600 each includes spectroscopy cells 410, 510, and 610; photodiodes 420, 520, and 620; and mirror(s) 430, 530 and 532, and 630 that are analogous to cells 110, 210 and 310, photodiode(s) 120 and 220, and mirror(s) 130, 230, and 330. Also shown are laser signal(s) 440, 540, and 640 that are analogous to laser signal(s) 140, 240, and 340. In some embodiments, systems 400, 500, and/or 600 may have mirrors at opposite ends, analogous to mirrors(s) 350 and 352. Systems 400, 500, and 600 operate in an analogous manner to systems 100, 200, and/or 300.

Systems 400, 500, and 600 indicate that the mirrors 420, 530 and 532, and 630 may have various configurations. For example, mirror 420 is trapezoidal in shape. Mirrors 530 and 532 are triangular in cross-section. However, mirrors 530 and 532 differ from mirrors 220 and 320 in that separate mirrors instead of a single mirror are used. Mirror 630 is parabolic in shape. Other configurations may be used.

Systems 400, 500, and 600 may thus share the benefits of the systems 100, 200, and 300. For example, higher signal-to-noise ratios may be achieved for smaller cell sizes. Therefore, systems 400, 500, and 600 may not only have improved performance, but may also be more readily integrated with technologies, such as a PIC. System 400, 500, and 600 may also be more rapidly stabilized and readily used.

Figure 7A:
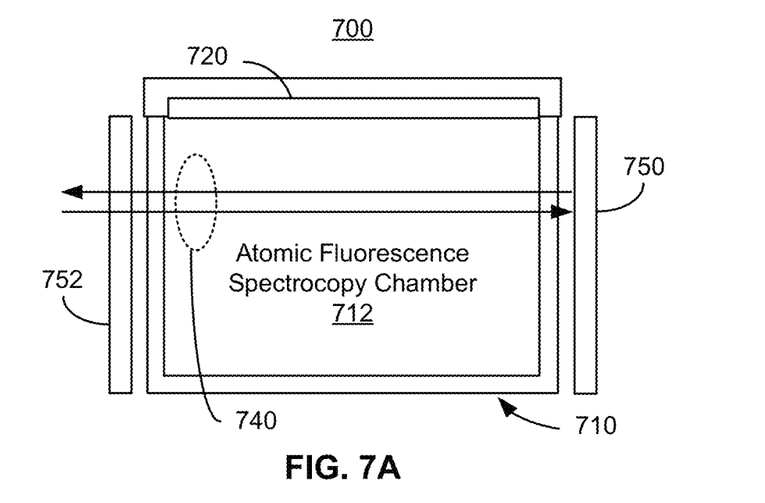
FIG. 7A-7B depict side and end views of an embodiment of a system for performing atomic fluorescence spectroscopy.
Figure 7B:
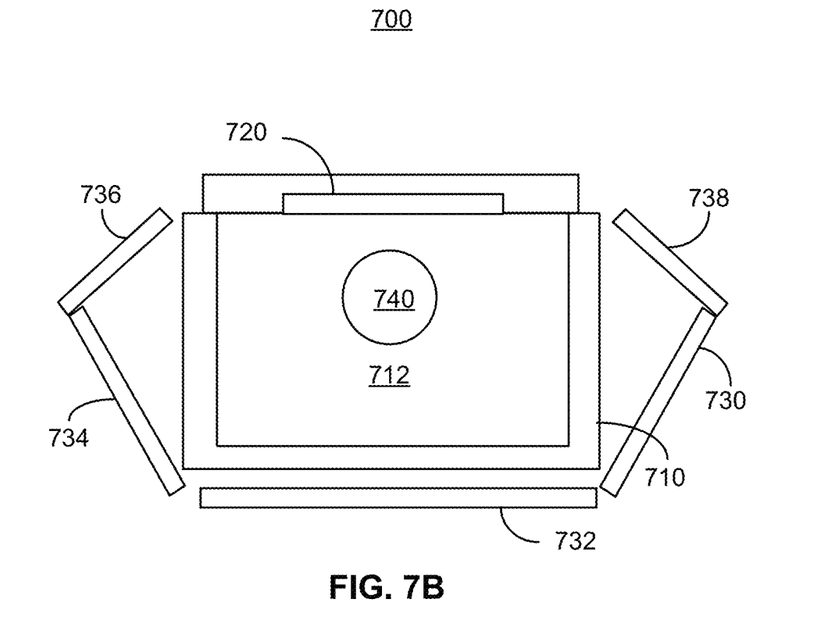

FIGS. 7A-7B depict side and end views of an embodiment of system 700 for performing atomic fluorescence spectroscopy. For simplicity, FIGS. 7A-7B are not to scale. System 700 is analogous to systems 100, 200, 300, 400, 500, and/or 600. Consequently, analogous components have similar labels. System 700 includes spectroscopy cell 710, photodiode 720, and mirror(s) 730, 732, 734, 736, and 738, that are analogous to cells 110, 210, 310, 410, 510, and 610; photodiode(s) 120, 220, 320, 420, and 520; and mirror(s) 130, 230, 330, 430, 530 and 532, and 630. Also shown are laser signal(s) 740 that are analogous to laser signal(s) 140, 240, 340, 440, 540, and 640. In some embodiments, system 700 may have mirrors at opposite ends, analogous to mirrors(s) 350 and 352. System 700 operates in an analogous manner to systems 100, 200, 300, 400, 500, and/or 600.

In system 700, mirrors 730, 732, 734, 736, and 738 are external to chamber 712. Thus, walls of chamber 712 may be transparent to fluorescent light from the vaper within chamber 712. However, mirrors 730, 732, 734, 736, and 738 still direct fluorescent light toward photodiode 720.

System 700 may thus share the benefits of the systems 100, 200, 300, 400, 500, and 600. For example, higher signal-to-noise ratios may be achieved for smaller cell sizes. Therefore, system 700 may not only have improved performance, but may also be more readily integrated with technologies, such as a PIC.

Figure 8:
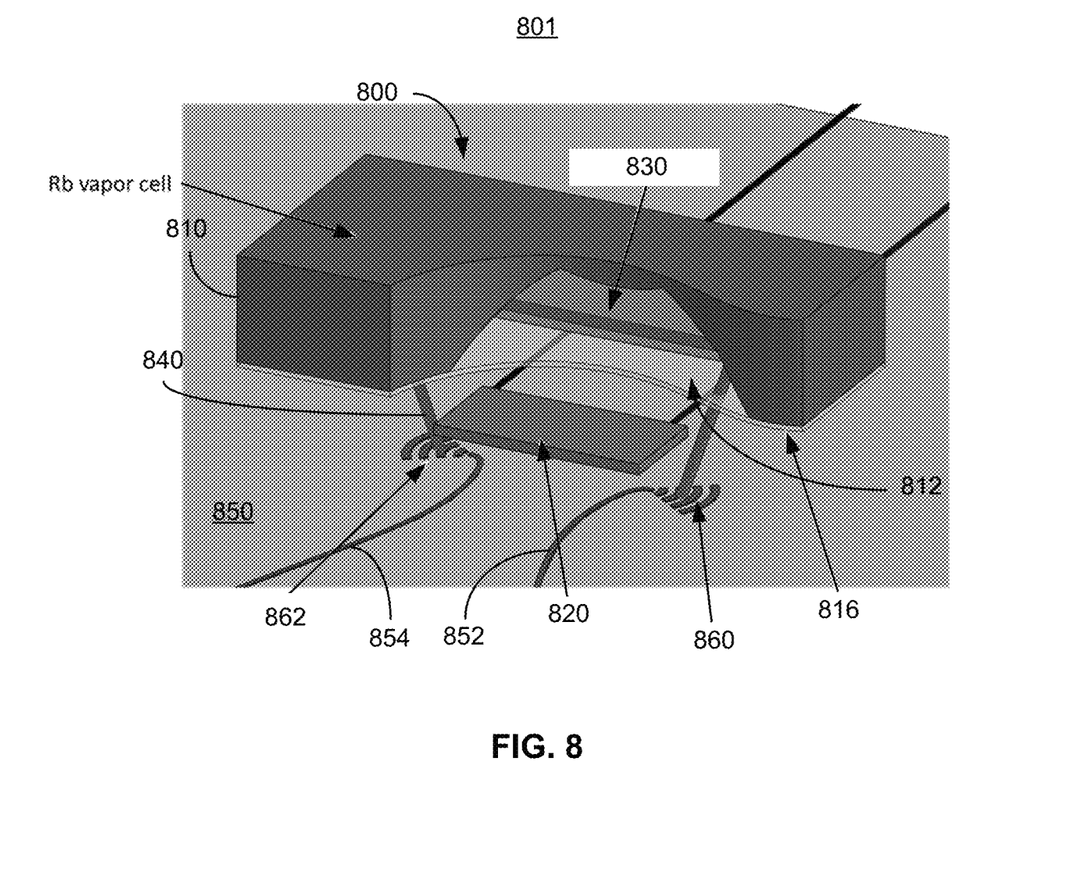
FIG. 8 depicts a perspective view of an embodiment of a system for performing atomic fluorescence spectroscopy.

FIG. 8 depicts a perspective view of an embodiment of system 801 that incorporates a system for performing atomic fluorescence spectroscopy and a PIC. For simplicity, FIG. 8 is not to scale. System 801 includes atomic fluorescence spectroscopy system 800 and PIC 850. System 800 is analogous to systems 100, 200, 300, 400, 500, 600, and/or 700. Consequently, analogous components have similar labels. System 800 includes spectroscopy cell 810, photodiode 820, and mirror(s) 830 that are analogous to cells 110, 210, 310, 410, 510, 610, and 710; photodiode(s) 120, 220, 320, 420, 520, and 620; and mirror(s) 130, 230, 330, 430, 530 and 532, 630, and 730, 732, 734, 736, and 738. Also shown is transparent cover 816 that is part of cell 810. Thus, in the embodiment shown, photodiode 820 is external to chamber 812. Photodiode 820 may be affixed to or part of PIC 850. In some embodiments, therefore, photodiode 820 might be considered part of PIC 850. In some embodiments, system 800 may have mirrors at opposite ends, analogous to mirrors(s) 350 and 352.

PIC 850 includes waveguides 852 and 854 as well as output gratings 860 and 862. Waveguides 852 and 854 guide laser signals through PIC 850. Output gratings 860 and 862 couple optical signals in waveguides 852 and 854 out-of-plane and into chamber 812 as laser signal(s) 840. Similarly, output gratings 860 and 862 couple laser signal(s) 840 in chamber 812 into waveguides 852 and 854. Thus, although termed output gratings, components 860 and 862 couple laser signals between PIC 850 and chamber 812. Although not shown, PIC 850 may include additional and/or different components.

System 800 operates in an analogous manner to systems 100, 200, 300, 400, 500, 600, and/or 700. Thus, PIC 850 carries laser signals in waveguides 852 and 854. The laser signals are output via output gratings 860 and 862. Laser signal(s) 840 reflect off of mirrors at opposite ends of chamber 812 and are transmitted to output gratings 862 and 860. Laser signal(s) 840 cause vapor in chamber 812 to fluoresce. Mirror(s) 830 reflect fluoresced light to photodiode 820.

System 800 may thus share the benefits of the systems 100, 200, 300, 400, 500, 600, and 700. For example, higher signal-to-noise ratios may be achieved for smaller cell sizes. Therefore, system 800 may not only have improved performance, but may also be more readily integrated with PIC 850 into system 801. In addition, system 800 may be more rapidly and readily used. Moreover, system 800 and PIC 850 may be readily assembled. For example, system 800 may be aligned and affixed to PIC 850. Consequently, fabrication of systems 800 and 801 may be facilitated.

Figure 9:
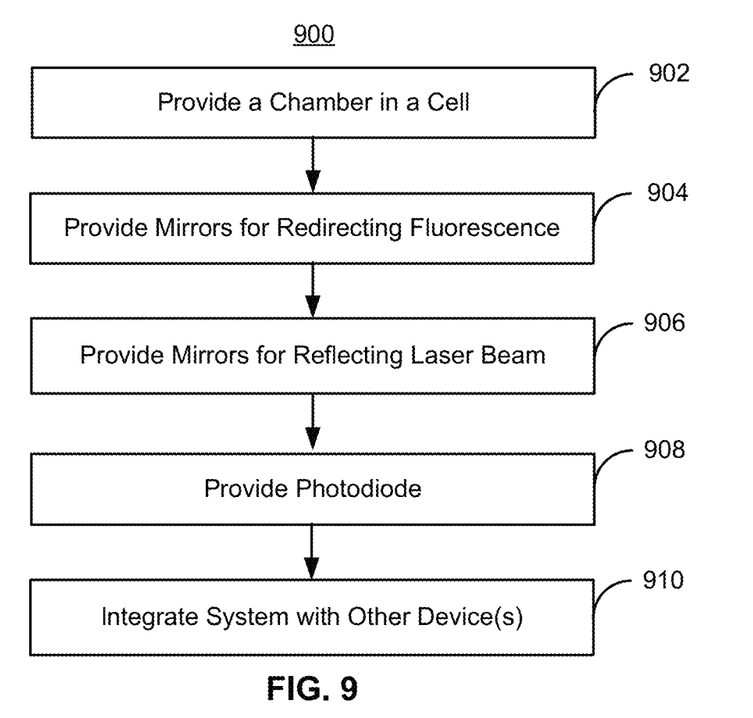
FIG. 9 is a flow-chart depicting an embodiment of a method for providing an atomic fluorescence spectroscopy system.

FIG. 9 is a flow chart depicting an embodiment of method 900 for providing an atomic fluorescence spectroscopy system. Steps of method 900 are shown in a particular order. In some embodiments, another order may be used. Further additional steps may be performed and/or some steps omitted. Steps of method 900 may also include substeps.

A chamber for an atomic fluorescence spectroscopy cell is provided, at 902. In some embodiments, 902 includes removing a portion of a substrate. Other shapes may be used. Mirrors are provided for the system, at 904. In some embodiments, such mirrors include mirrors used to redirect fluorescent light. In some embodiments, 904 also include forming mirrors used to direct laser signal(s). Mirrors for redirecting laser signal(s) may be provided, at 906. In some embodiments, 904 and 906 may be combined. For example, 906 may include coating the inner surface of the chamber with reflective material.

A photodiode for the system is provided, at 908. In some embodiments, 908 includes sealing the chamber formed in 902 using the photodiode provided at 908. In such embodiments, 908 also includes introducing the desired vapor into the chamber. In some embodiments, the photodiode may be formed as part of a different device, such as a PIC.

The spectroscopy system may be integrated with another device, at 910. For example, the system may be sealed, aligned with the desired structures, and affixed to the other device. Thus, using method 900, an improved atomic fluorescence spectroscopy system may be provided.

For example, system 300 may be formed using method 900. At 902, a v-groove is formed in a substrate. At 904, mirrors 330 are formed. Mirrors 350 and 352 may also be formed, at 906. In some embodiments, 904 and 906 are combined. For example, the interior surfaces of cell 310 may be coated with a reflective material. At 908 photodiode 320 may be provided. As part of 908, photodiode 320 is affixed to cell 310 after a vapor has been introduced and mirrors 330, 350 and 352 formed. In other embodiments, the chamber may be sealed separately from the photodiode being provided. For example, for spectroscopy system 800, glass cover 816 may be used to seal chamber 812. Photodiode 820 may be provided as part of formation of PIC 850. At 910, the spectroscopy system may be integrated with another device. For example, system 800 may be placed such that chamber 812 is aligned with output gratings 860 and 862 and affixed to PIC 850.

Thus, method 900 may be used to fabricate an atomic fluorescence spectroscopy system, such as system(s) 100, 200, 300, 400, 500, 600, 700, and/or 800. Consequently, the benefits of such systems may be achieved.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A spectroscopy system, comprising:
a cell having a plurality of walls and forming a chamber therein, the chamber being configured to receive at least one laser signal and retaining a vapor therein, the vapor fluorescing in response to the at least one laser signal;
a photodiode; and
a plurality of mirrors configured to direct fluorescent light from the vapor toward the photodiode;
wherein the chamber has a length in a direction of propagation of the at least one laser signal not exceeding ten millimeters.

2. The spectroscopy system of claim 1, further comprising:
a first mirror; and
a second mirror opposite to the first mirror, the first mirror and the second mirror reflecting the at least one laser signal such that laser beams propagate in opposing directions in the chamber.

3. The spectroscopy system of claim 1, wherein the plurality of mirrors is external to the chamber.

4. The spectroscopy system of claim 1, wherein the length does not exceed five millimeters.

5. The spectroscopy system of claim 1, wherein the cell is integrated with a photonic integrated circuit.

6. The spectroscopy system of claim 1, wherein a mirror cross section of the plurality of mirrors forms a first portion of a geometric shape in a plane perpendicular to a direction of propagation of the at least one laser signal and a photodiode cross section forms a second portion of the geometric shape in the plane perpendicular to the direction of propagation, the second portion being opposite to the first portion, the geometric shape being selected from a triangle, a trapezoid, and a paraboloid.

7. The spectroscopy system of claim 2, wherein the plurality of mirrors is internal to the chamber.

8. The spectroscopy system of claim 5, wherein the photonic integrated circuit further includes:
   a first output grating for coupling a first laser signal of the at least one laser signal to the chamber; and
   a second output grating for coupling a second laser signal of the at least one laser signal to the chamber.

9. A photonic integrated circuit (PIC), comprising:
   a plurality of output gratings residing on a substrate, the plurality of output gratings being configured to couple at least one laser signal out-of-plane with respect to the substrate, thereby providing at least one out-of-plane laser signal; and
   a PIC spectroscopy system coupled to a surface of the PIC, the PIC spectroscopy system including a cell, a photodiode, and a plurality of mirrors, the cell having a plurality of walls and forming a chamber therein, the chamber being aligned with the plurality of output gratings and retaining a vapor, the vapor fluorescing in response to the at least one out-of-plane laser signal, the plurality of mirrors being configured to direct fluorescent light from the vapor to the photodiode.

10. The PIC of claim 9, wherein the PIC spectroscopy system further includes:
    a first mirror; and
    a second mirror opposite to the first mirror, the first mirror and the second mirror reflecting the at least one out-of-plane laser signal such that laser beams propagate in opposing directions in the chamber.

11. The PIC of claim 9, wherein the chamber has a length in a direction of propagation of the at least one out-of-plane laser signal not exceeding five millimeters.

12. The PIC of claim 9, wherein a mirror cross section of the plurality of mirrors forms a first portion of a geometric shape and a photodiode cross section forms a second portion of the geometric shape in a plane perpendicular to a direction of propagation of the at least one out-of-plane laser signal, the second portion being opposite to the first portion, the geometric shape being selected from a triangle, a trapezoid, and a paraboloid.

13. The PIC of claim 10, wherein the first mirror, the second mirror, and the plurality of mirrors are internal to the chamber.

14. A method for providing a spectroscopy system, comprising:
    providing a cell having a plurality of walls and forming a chamber therein, the chamber being configured to receive at least one laser signal and to retain a vapor therein, the vapor fluorescing in response to the at least one laser signal;
    coupling a plurality of mirrors to the plurality of walls;
    providing a photodiode, the plurality of mirrors being oriented to direct fluorescent light from the vapor toward the photodiode; and
    mounting the cell on a photonic integrated circuit, where the mounting includes aligning the chamber with a plurality of output gratings for the photonic integrated circuit.

15. The method of claim 14, further comprising:
    providing a first mirror; and
    providing a second mirror opposite to the first mirror, the first mirror and the second mirror reflecting the at least one laser signal such that laser beams propagate in opposing directions in the chamber.

16. The method of claim 14, wherein the providing the cell further includes removing a portion of a vacuum chamber substrate to provide the chamber; and wherein the providing the photodiode further includes:
    mounting the photodiode to the vacuum chamber substrate.

17. The method of claim 15, wherein the providing the plurality of mirrors further includes:
    mounting plurality of mirrors on at least a portion of the plurality of walls of the chamber.

\* \* \* \* \*